US012018931B2

(12) United States Patent
Vo et al.

(10) Patent No.: US 12,018,931 B2
(45) Date of Patent: Jun. 25, 2024

(54) SURFACE PROFILE INSPECTION METHODS AND SYSTEMS

(71) Applicant: Nanyang Technological University, Singapore (SG)

(72) Inventors: Xuan Quoc Vo, Singapore (SG); Anh Tuan Tran, Singapore (SG)

(73) Assignee: Nanyang Technological University, Singapore (SG)

( * ) Notice: Subject to any disclaimer, the term of this patent is extended or adjusted under 35 U.S.C. 154(b) by 43 days.

(21) Appl. No.: 17/749,338

(22) Filed: May 20, 2022

(65) Prior Publication Data

US 2022/0373322 A1 Nov. 24, 2022

(51) Int. Cl.
*G01B 11/24* (2006.01)
(52) U.S. Cl.
CPC .................. *G01B 11/2441* (2013.01)
(58) Field of Classification Search
CPC ............ G01B 11/2441; G01B 9/02018; G01B 9/02014; G01B 9/02057; G01M 11/005; G01M 11/025; G01M 11/0271
See application file for complete search history.

(56) References Cited

U.S. PATENT DOCUMENTS

2010/0118313 A1* 5/2010 Deck .................. G01B 9/02087
356/450
2010/0128283 A1* 5/2010 Liesener .............. G01B 9/0209
359/370

FOREIGN PATENT DOCUMENTS

CN 106643558 A * 5/2017
DE 102017201795 A1 * 2/2018 .......... G01M 11/005

OTHER PUBLICATIONS

T. O. Körner, J. T. Sheridan, and J. Schwider, "Interferometric resolution examined by means of electromagnetic theory," J. Opt. Soc. Am. A 12, 752-760 (1995) (Year: 1995).*
Liu, W.K., Li, S. & Park, H.S. Eighty Years of the Finite Element Method: Birth, Evolution, and Future. Arch Computat Methods Eng 29, 4431-4453 (2022). https://doi.org/10.1007/s11831-022-09740-9 (Year: 2022).*

* cited by examiner

*Primary Examiner* — Uzma Alam
*Assistant Examiner* — Jonathon Cook
(74) *Attorney, Agent, or Firm* — Casimir Jones, S.C.; Brian F. Bradley (57) ABSTRACT

A surface profile inspection method and a surface profile inspection system are provided. The surface profile inspection method includes capturing a plurality of interferograms of a surface profile depicting interference between a specimen beam reflected from a surface having the surface profile and a modulated reference beam, wherein each of the plurality of interferograms corresponds to a phase of modulation of the modulated reference beam; extracting pixel values of the plurality of interferograms; calculating phase information of each of the plurality of interferograms based on the extracted pixel values, the phase information of each of the plurality of interferograms related to the phase of modulation of the modulated reference beam at a time the interferogram was captured; and reconstructing the surface profile based on the calculated phase information.

15 Claims, 10 Drawing Sheets

SURFACE PROFILE INSPECTION METHODS AND SYSTEMS

PRIORITY CLAIM

This application claims priority from Singapore Patent Application No. 10202105330W filed on 20 May 2021.

TECHNICAL FIELD

The present invention generally relates to surface inspection methods, and more particularly relates to surface profile inspection methods and systems.

BACKGROUND OF THE DISCLOSURE

One approach to anti-contaminants and self-cleaning applications is to use soft coatings. For example, surfaces can be coated with a soft coating such as a responsive hydrogel. The responsive hydrogel coatings which are applied on the surfaces can have the ability to reverse surface adhesion such as releasing oils underwater or releasing cells and bacteria, hence may be useful for anti-contaminants and self-cleaning applications. However, development of the soft coatings is currently conducted by trial-and-error approaches due to lack of accurate characterization tools and limited physical understanding of the wetting and de-wetting dynamics on soft coatings surfaces.

When a liquid droplet is deposited on the soft coating surface, three main events occur concurrently at a three-phase contact line—a capillary-driven wetting motion of the liquid on the soft coating, a wetting ridge formation due to interfacial tension of the liquid pulling the soft coating surface, and diffusion of the liquid into the soft coating causing changes in physicochemical properties of the soft coating. These dynamic events affect one another. A means to characterize the wetting dynamics of the liquid on the soft coating surfaces is to trace the formation of the wetting ridge at the three-phase contact line in both space and time. However, the formation of the wetting ridge is fast (within a few milliseconds) and at a microscopic scale making it challenging to visualize. In addition, the soft coatings are transparent, making it difficult to be observed using normal microscopy or laser scanning microscopy techniques. Further, applying a high surface tension droplet, such as a water droplet, on the soft coating with a Young modulus of orders of kPa may cause a large deformation and a high slope of the wetting ridge (up to 30 degrees), resulting in difficulties in visualization. Also, a hydration process on the soft coating can cause changes in refractive index and stiffness of the soft coating during the wetting.

Thus, there is a need for surface profile inspection methods and systems which overcome the drawbacks of the prior art and provide an improved surface profile characterization of the soft coatings at the three-phase contact line with temporal and spatial details that are resolvable for the development of the soft coatings. Furthermore, other desirable features and characteristics will become apparent from the subsequent detailed description and the appended claims, taken in conjunction with the accompanying drawings and this background of the disclosure.

SUMMARY

According to a first aspect, there is provided a surface profile inspection method, comprising: capturing a plurality of interferograms of a surface profile depicting interference between a specimen beam reflected from a surface having the surface profile and a modulated reference beam, wherein each of the plurality of interferograms corresponds to a phase of modulation of the modulated reference beam; extracting pixel values of the plurality of interferograms; calculating phase information of each of the plurality of interferograms based on the extracted pixel values, the phase information of each of the plurality of interferograms related to the phase of modulation of the modulated reference beam at a time the interferogram was captured; and reconstructing the surface profile based on the calculated phase information.

According to a second aspect, there is provided a surface profile inspection system, comprising: an optical creating means configured to emit an incident beam; a specimen supporting means configured to support a specimen having a surface having a surface profile and a reference mirror having a reference surface, wherein the reference mirror is supported on an actuator configured to modulate a reference beam; an optical directing means configured to direct the emitted incident beam towards the surface having the surface profile and the reference surface; an image-capturing means configured to capture a plurality of interferograms of the surface profile depicting interference between a specimen beam reflected from the surface having the surface profile and the modulated reference beam, wherein each of the plurality of interferograms corresponds to a phase of modulation of the modulated reference beam; and a processing means configured to: extract pixel values of the plurality of interferograms; calculate phase information of each of the plurality of interferograms based on the extracted pixel values, the phase information of each of the plurality of interferograms related to the phase of modulation of the modulated reference beam at a time the interferogram was captured; and reconstruct the surface profile based on the calculated phase information.

According to a third aspect, there is provided a computer readable medium comprising instructions for a processor to perform a surface profile inspection method, the instructions causing the processor to: capture a plurality of interferograms of a surface profile depicting interference between a specimen beam reflected from a surface having the surface profile and a modulated reference beam, wherein each of the plurality of interferograms corresponds to a phase of modulation of the modulated reference beam; extract pixel values of the plurality of interferograms; calculate phase information of each of the plurality of interferograms based on the extracted pixel values, the phase information of each of the plurality of interferograms related to the phase of modulation of the modulated reference beam at a time the interferogram was captured; and reconstruct the surface profile based on the calculated phase information.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 4, comprising FIGS. 4A and 4B, depicts illustrations of example applications of the surface profile inspection system of FIG. 1 in accordance with the present embodiments, wherein

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of present embodiments to present surface profile inspection methods and systems which provide an improved surface profile characterization of soft coatings at a three-phase contact line hence providing more accurate information for the development of the soft coatings. In accordance with the present embodiments, a surface profile inspection method is provided. The surface profile inspection method includes capturing a plurality of interferograms of a surface profile depicting interference between a specimen beam reflected from a surface having the surface profile and a modulated reference beam. Each of the plurality of interferograms corresponds to a phase of modulation of the modulated reference beam. The surface profile inspection method further includes extracting pixel values of the plurality of interferograms. The surface profile inspection method also includes calculating phase information of each of the plurality of interferograms based on the extracted pixel values, the phase information of each of the plurality of interferograms related to the phase of modulation of the modulated reference beam at a time the interferogram was captured. Further, the surface profile inspection method includes reconstructing the surface profile based on the calculated phase information.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the specification contained herein. Moreover, the computer program is not intended to be limited to any particular control flow. There are many other variants of the computer program, which can use different control flows.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Figure 1:
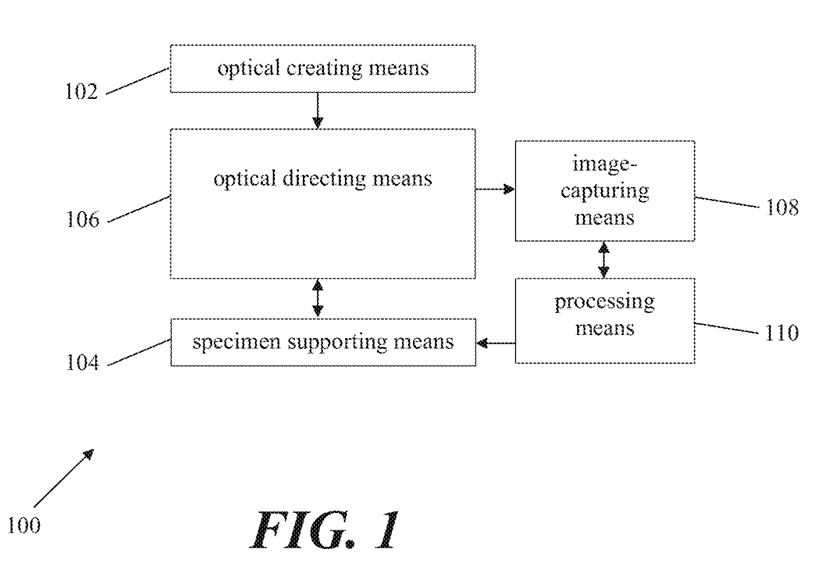
FIG. 1 depicts a block diagram illustrating a surface profile inspection system in accordance with present embodiments.

FIG. 1 depicts a block diagram 100 illustrating a surface profile inspection system in accordance with present embodiments. The surface profile inspection system comprises an optical creating means 102 configured to emit an incident beam. The surface profile inspection system also comprises a specimen supporting means 104 configured to support a specimen having a surface with a surface profile and a reference mirror having a reference surface. The reference mirror is supported on an actuator configured to modulate a reference beam. The reference beam is a beam reflected from the reference surface of the reference mirror. Further, the surface profile inspection system comprises an optical directing means 106 configured to direct the emitted incident beam towards the surface having the surface profile and the reference surface. In addition, the surface profile inspection system comprises an image-capturing means 108 configured to capture a plurality of interferograms of the surface profile depicting interference between a specimen beam reflected from the surface having the surface profile and the modulated reference beam. Each of the plurality of interferograms corresponds to a phase of modulation of the modulated reference beam. The surface profile inspection system further comprises a processing means 110 configured to extract pixel values of the plurality of interferograms, calculate phase information of each of the plurality of interferograms based on the extracted pixel values, the phase information of each of the plurality of interferograms related to the phase of modulation of the modulated reference beam at a time the interferogram was captured and reconstruct the surface profile based on the calculated phase information. As a non-limiting example, the processing means 110 may comprise an algorithm developed using a MATLAB software. While the processing means 110 can be a single device, it can also comprise multiple devices for performing the aforementioned functions.

According to some embodiments, the processing means 110 can be further configured to reconstruct the surface profile based on the calculated phase information and one or more pre-defined boundary conditions. As will be explained in more details later, the pre-defined boundary conditions may comprise a horizontal-axis parameter, a vertical-axis parameter and/or an angle parameter. The processing means 110 may be further configured to calculate a corrected horizontal-axis parameter and/or a corrected vertical-axis parameter based on a Finite Element Method to reconstruct the surface profile.

Figure 2:
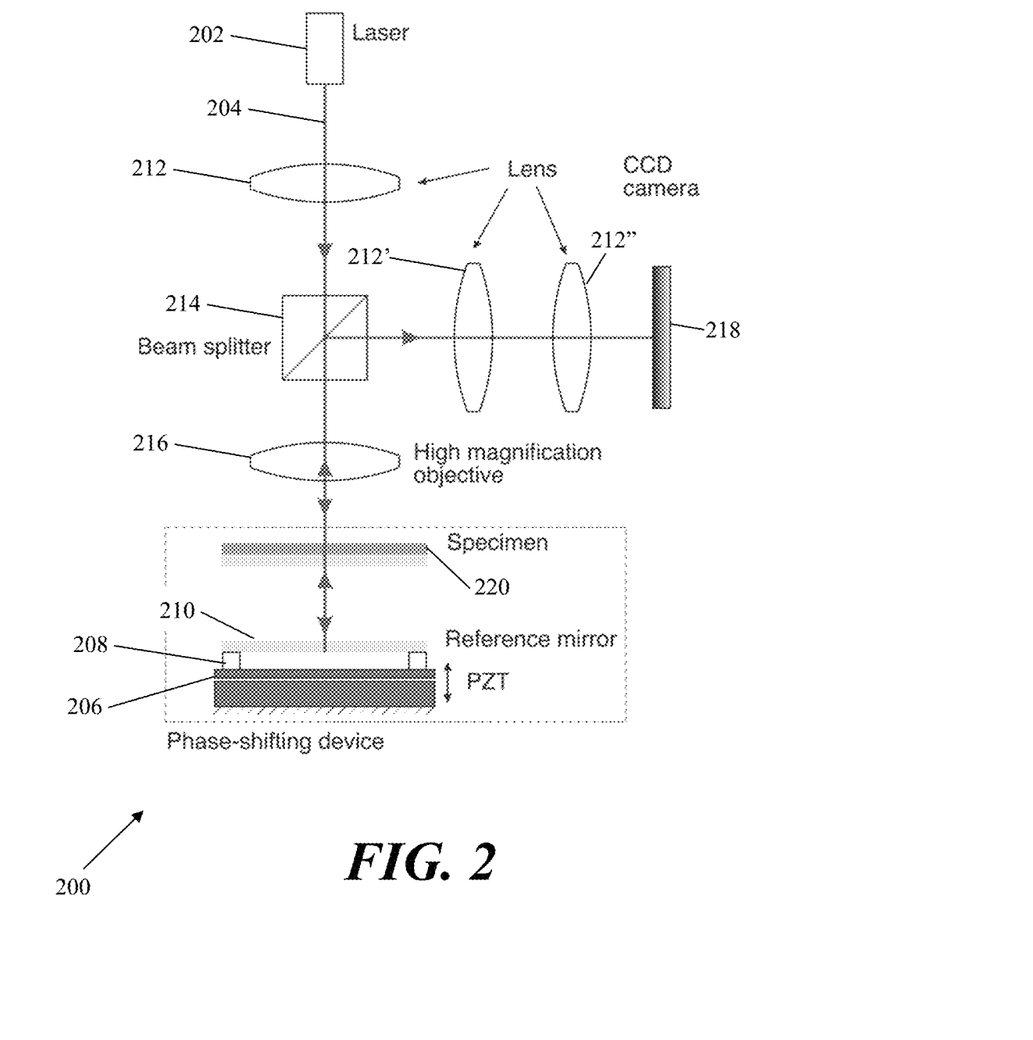
FIG. 2 depicts an illustration of a surface profile inspection system in accordance with the present embodiments.

FIG. 2 depicts an illustration of a surface profile inspection system 200 in accordance with present embodiments. As shown in FIG. 2, the optical creating means 102 of FIG. 1 can be a laser source 202. Accordingly, the incident beam 204 can be a laser beam.

The specimen supporting means 104 of FIG. 1 can include the actuator 206 configured to modulate the reference beam and spacers 208 disposed between the actuator 206 and the reference mirror 210. The actuator 206 can be a high-speed actuator. According to some embodiments, the actuator 206 may comprise a piezoelectric actuator having an actuation speed synchronized to an image-capturing speed of the image-capturing means 108 of FIG. 1 by the processing means 110. The image-capturing means 108 of FIG. 1 may be further configured to capture the plurality of interferograms within a plurality of pre-determined phase locations of the actuator 206. The plurality of pre-determined phase locations of the actuator 206 can be within a plurality of pre-determined locations of the actuator 206. As a non-limiting example, for each cycle of the actuator 206 (i.e. from 0 to $2\pi$) five interferograms can be captured at the phase locations of the actuator 206, namely at 0, $\pi/5$, $2\pi/5$, $3\pi/5$, and $4\pi/5$, respectively.

Further, the actuator 206 may be operated within an operation range. The operation range may correspond to one wavelength of the incident beam 204. As a non-limiting example, the spacers 208 can be round spacers. In some implementations, the spacers 208 can be relatively light weight. Advantageously, the light weight spacers allow the actuator 206 to be actuated at a desired speed to modulate the reference beam.

According to some embodiments, the optical directing means 106 of FIG. 1 may comprise a Fizeau-type interferometer. As shown in FIG. 2, the optical directing means 106 can include a plurality of lens 212, 212', 212", one or more beam splitters 214 and an objective lens 216. The objective lens 216 can be a high magnification objective lens. As a non-limiting example, the magnification range of the high magnification objective lens can be between 60× and 100×.

The image-capturing means 108 of FIG. 1 can include a camera 218, such as a charge-coupled device (CCD) camera. As a non-limiting example, the camera 218 can be a small pixel-size CCD camera of 6.4 µm/pixel. The plurality of lenses 212, 212', 212" can be disposed between the laser source 202 and the one or more beam splitters 214, and between the one or more beam splitters 214 and the camera 218. The objective lens 216 can be disposed between the one or more beam splitters 214 and a specimen 220.

Beneficially, the surface profile inspection system 200 in accordance with the present embodiments provides improved resolution spatially and temporally. By using the high magnification objective lens and the small pixel-size CCD camera, a lateral resolution of the surface profile inspection system is improved up to 100 nm/pixel. Further, a temporal resolution of the surface profile inspection system, which is determined by the image-capturing speed of the camera 218 and the actuation speed of the actuator 206, is improved up to 1000 cycles per second.

Figure 3:
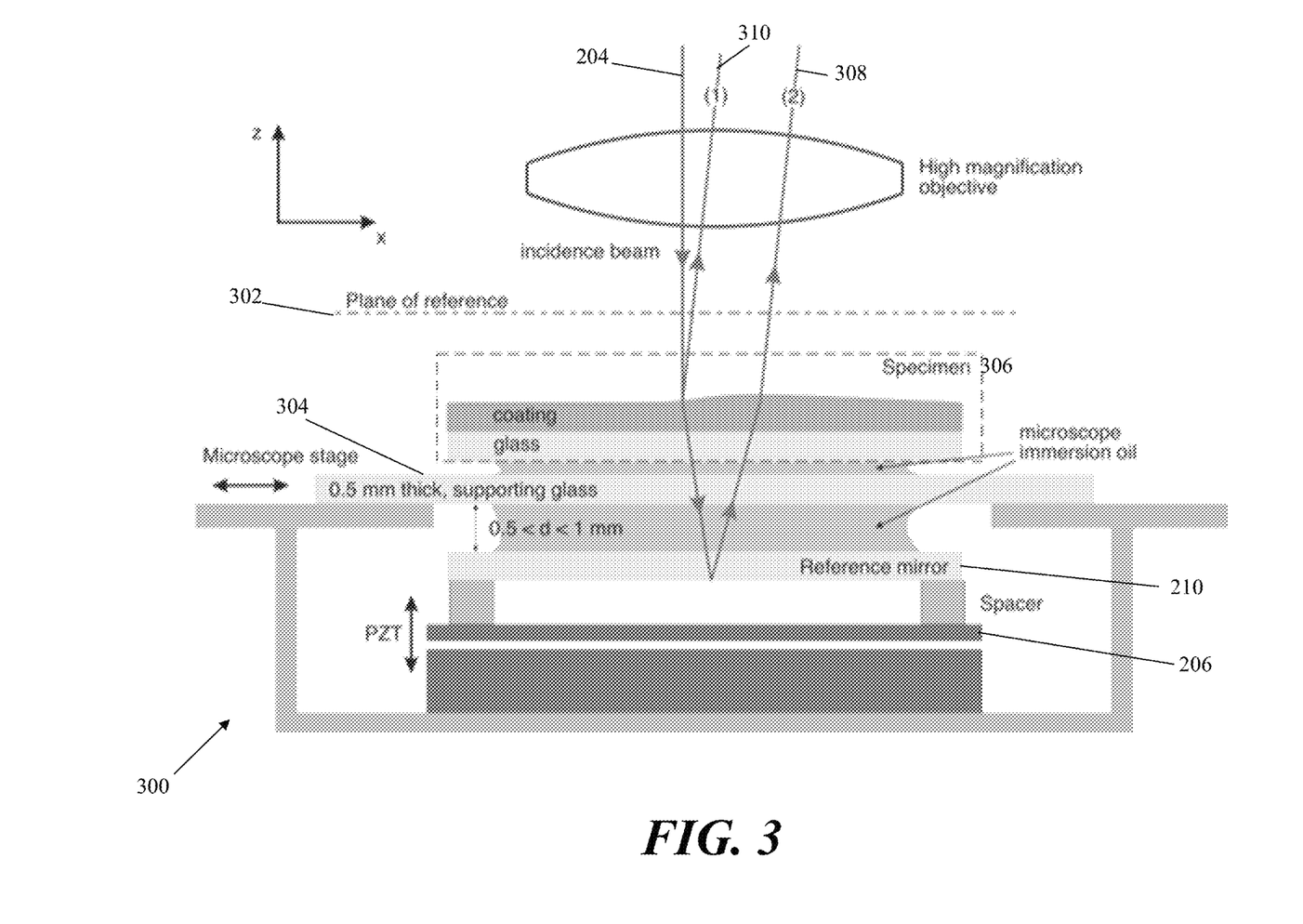
FIG. 3 depicts a magnified view of the specimen supporting means of the surface profile inspection system of FIG. 2 depicting the incidence, reference and specimen beams in accordance with the present embodiments.

FIG. 3 depicts a magnified view 300 of the specimen supporting means 104 of the surface profile inspection system 200 in accordance with present embodiments. Advantageously, the arrangement of the actuator 206 and the reference mirror 210 as depicted in FIG. 3 allows the specimen supporting means 104 of FIG. 1 to be compact, portable, and also integrable to a device such as a translational stage of an inverted microscope. As shown in FIG. 3, the actuator 206 may be operated in a direction perpendicular to a reference plane 302 (i.e. z-direction). The reference plane 302 is perpendicular to the incident beam 204. As mentioned above, the actuator 206 may be operated within an operation range that corresponds to one wavelength of the incident beam 204. As a non-limiting example, one wavelength of the incident beam 204 can be 532 nm.

A microscope glass slide 304 with a thickness of, for example 0.5 mm, may be used to provide support for the specimen 306. The reference mirror 210 can be a cover glass and the reference surface can be a bottom surface of the cover glass. Microscope immersion oil may be used to optically couple the microscope glass slide 304 and the reference mirror 210 to minimize reflections at an intermediate interface. A microscope immersion oil layer disposed between the microscope glass slide 304 and the reference mirror 210 can be relatively thick, for example between 0.5 mm and 1 mm, to provide a low viscous resistance, hence advantageously allowing high-speed oscillating motions of the reference mirror 210 in the z-direction. The microscope immersion oil may also be used to optically couple the specimen 306 and the microscope glass slide 304 to reduce reflections. The arrangement shown in FIG. 3 allows a reference beam 308 to interfere with a specimen beam 310 to obtained interferograms carrying phase information of the surface profile of the specimen 306.

Figure 4A:
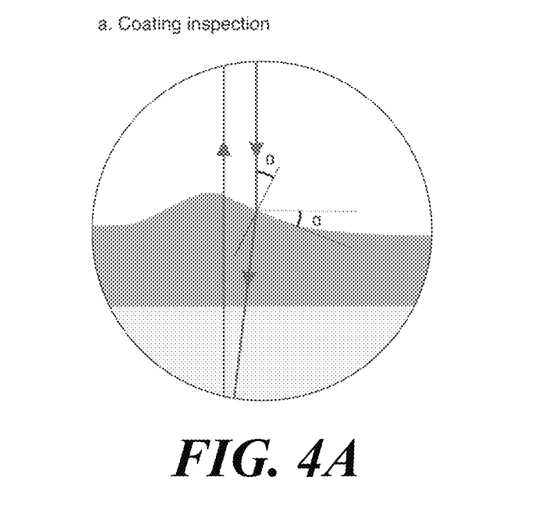
FIG. 4A depicts an illustration of a soft coating inspection application and FIG. 4B depicts an illustration of a visualization of a dynamic wetting ridge application.
Figure 4B:
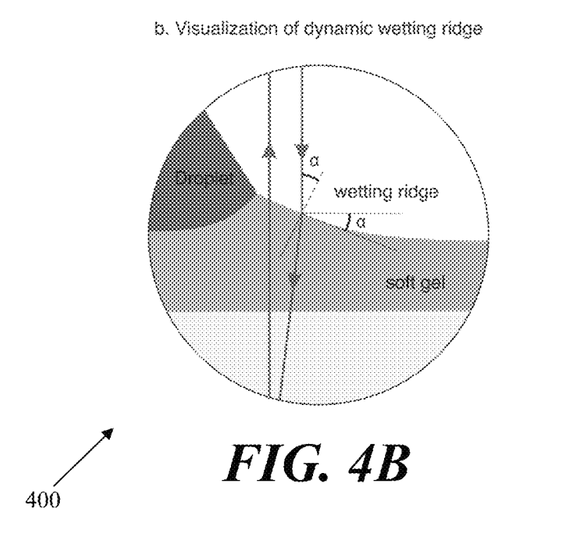

Due to relatively good resolutions both spatially and temporally, the surface profile inspection system can be used for applications ranging from static inspections to dynamic measurements of coating surface profiles such as soft coating surface profiles or visualization of dynamic wetting ridges. Advantageously, the surface profile inspection system allows inspection of the surface profiles below a diffraction limit of light (i.e. below 100 nm) and within a few milliseconds. FIG. 4, comprising FIGS. 4A and 4B, depicts illustrations 400 of example applications of the surface profile inspection system of FIG. 1, wherein FIG. 4A depicts an illustration of a soft coating surface inspection application in accordance with the present embodiments and FIG. 4B depicts an illustration of visualization of a dynamic wetting ridge surface inspection application in accordance with the present embodiments.

Figure 5:
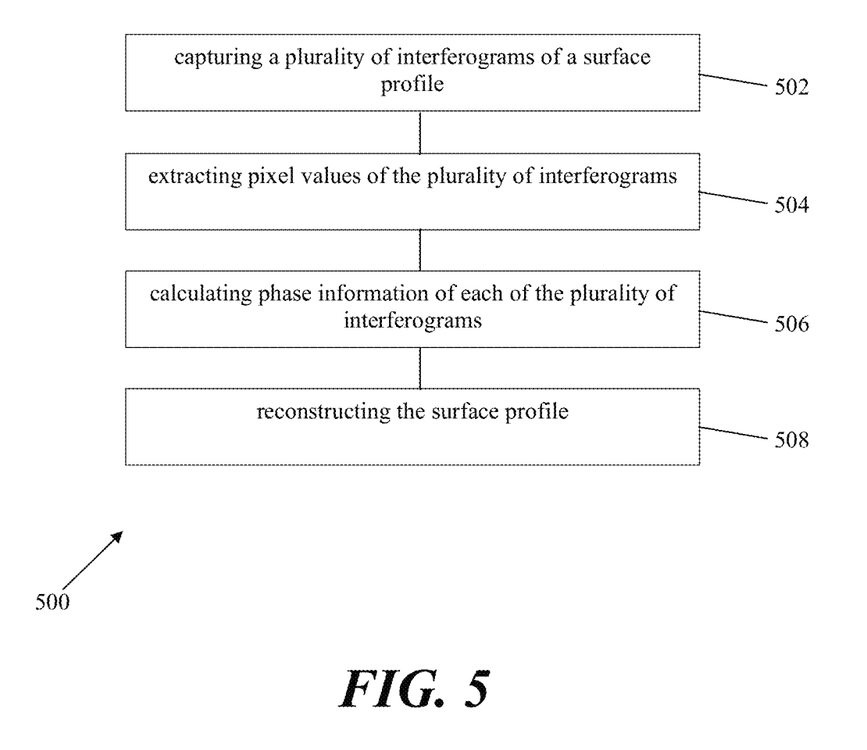
FIG. 5 depicts a first flowchart illustrating a surface profile inspection method in accordance with the present embodiments.

FIG. 5 depicts a first flowchart 500 illustrating a surface profile inspection method in accordance with present embodiments. At step 502, a plurality of interferograms of a surface profile depicting interference between a specimen beam reflected from a surface having the surface profile and a modulated reference beam are captured. Each of the plurality of interferograms corresponds to a phase of modulation of the modulated reference beam. At step 504, pixel values of the plurality of interferograms are extracted. At step 506, phase information of each of the plurality of interferograms are calculated based on the extracted pixel values, the phase information of each of the plurality of interferograms related to the phase of modulation of the modulated reference beam at a time the interferogram was captured. At step 508, the surface profile is reconstructed based on the calculated phase information. More details on this step will be discussed with reference to FIG. 7 later.

Figure 6:
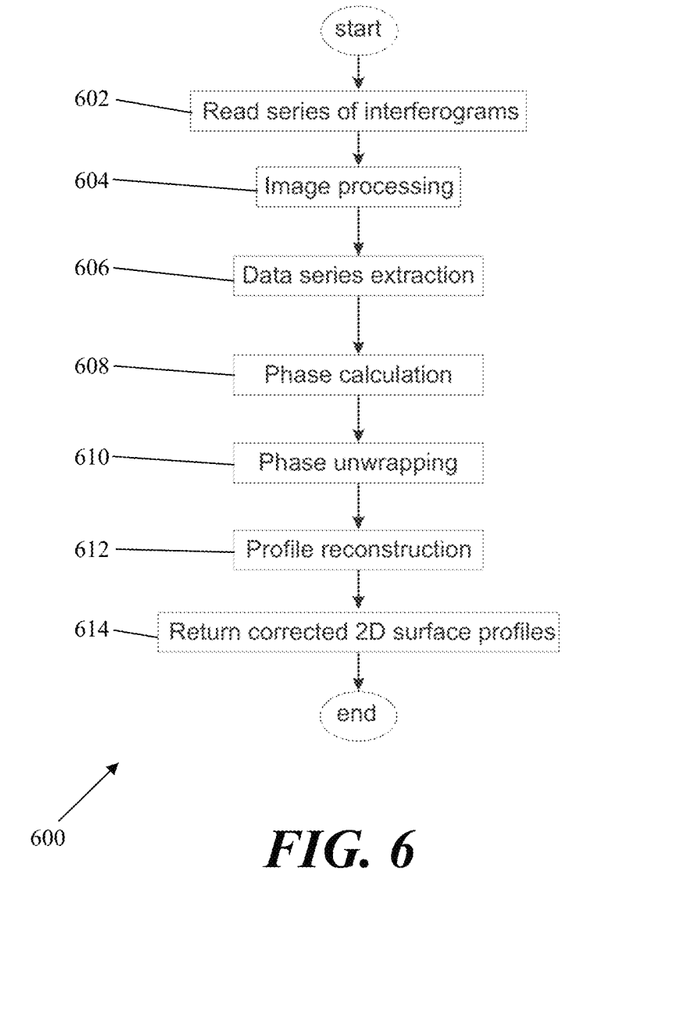
FIG. 6 depicts a second flowchart illustrating the surface profile inspection method in accordance with the present embodiments.

FIG. 6 depicts a second flowchart 600 illustrating the surface profile inspection method in accordance with present embodiments. At step 602, the plurality of interferograms of the surface profile are read. At step 604, the plurality of interferograms are processed. The processing of the plurality of interferograms may comprise background subtraction and/or Fast Fourier Transform (FFT) filtering. At step 606, data of the plurality of interferograms are extracted. The plurality of interferograms may be grayscale images and extracting data of the plurality of interferograms may comprise extracting a grayscale value of each pixel in the grayscale images. At step 608, phase information is calculated. The phase information may be calculated using a 5-point algorithm. At step 610, phase unwrapping is performed. At step 612, the surface profile is reconstructed. At step 614, corrected surface profiles are returned.

Figure 7:
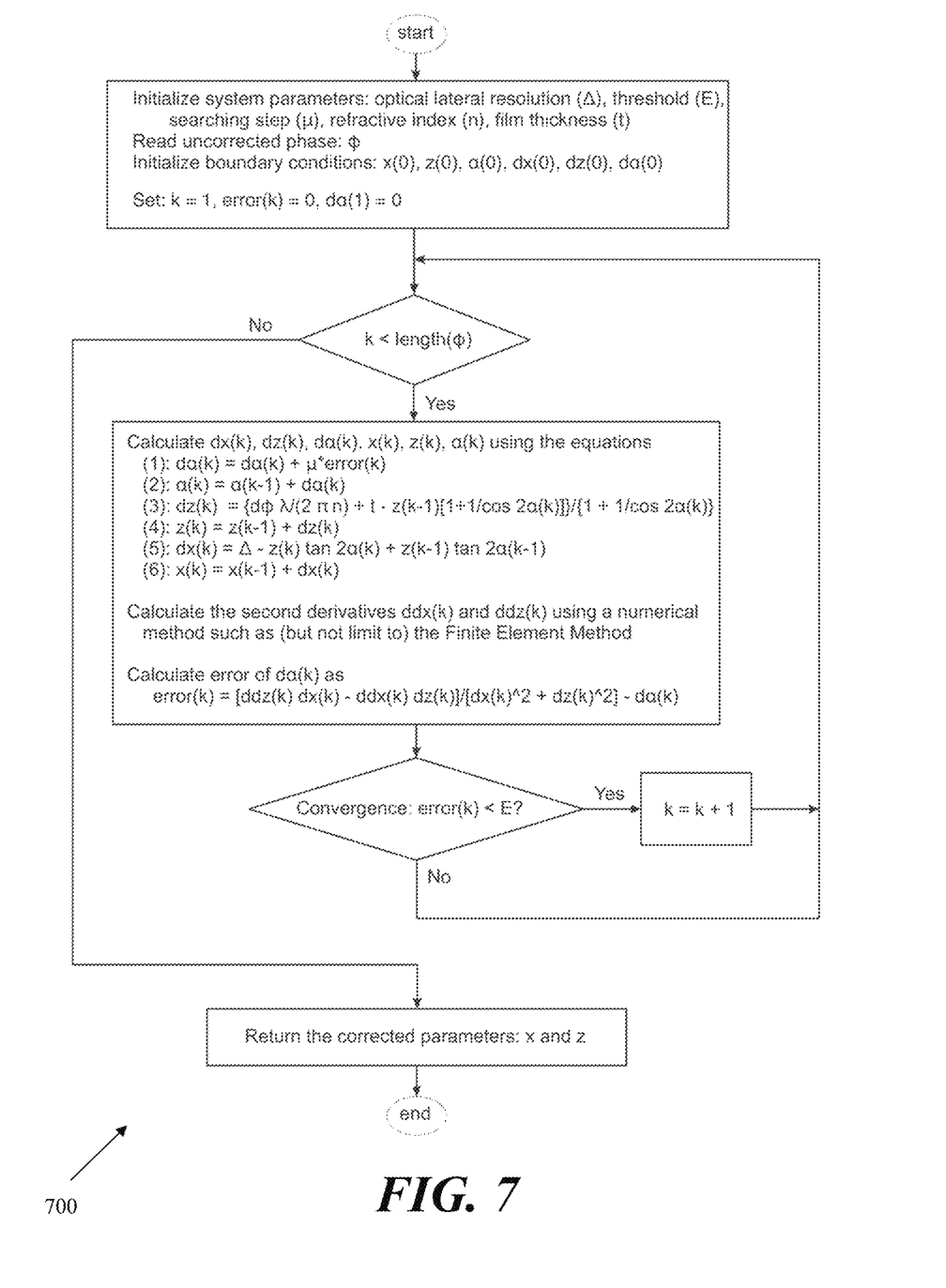
FIG. 7 depicts a flowchart illustrating an algorithm for a reconstructing step of the surface profile inspection method of the flowchart of FIG. 5 in accordance with the present embodiments.

FIG. 7 depicts a flowchart 700 illustrating an algorithm for a reconstructing step of the surface profile inspection method of the flowchart of FIG. 5 in accordance with the present embodiments. According to some embodiments, reconstructing the surface profile may comprise determining the surface profile based on the calculated phase information and one or more pre-defined boundary conditions. The pre-defined boundary conditions may comprise a horizontal-axis parameter, a vertical-axis parameter and/or an angle parameter. As shown in FIG. 7, the horizontal-axis parameter may be denoted by x, the vertical-axis parameter may be denoted by z and the angle parameter may be denoted by a. Referring to FIGS. 4A and 4B, the angle parameter can be the angle between the reference plane which is perpendicular to the incident beam and a slope of the surface profile.

Typical interferometric data processing algorithms may only be able to resolve surface profiles with slopes that are less than 10 degrees with reference to the reference plane. This can be due to a small angle approximation applied in these typical interferometric data processing algorithms. In other words, both the reference beam and the specimen beam are assumed to be perpendicular to the reference plane. With surface profiles having slopes of a larger angle, such as slopes of wetting ridge profiles as shown in FIG. 4B, these typical interferometric data processing algorithms can produce substantial errors. The algorithm for reconstructing the surface profile as depicted in FIG. 7 seeks to overcome this limitation. Beneficially, the algorithm is an auto-correcting algorithm that is able to auto-correct errors to reconstruct the surface profile. In this algorithm, instead of using the small angle approximation, a full expression of an optical path difference (OPD) between the reference beam and the specimen beam is used leading to the expressions of the corrected vertical-parameter and/or the corrected horizontal-parameter as respectively depicted in equations (3) and (5) of FIG. 7. According to some embodiments, reconstructing the surface profile may comprise calculating a corrected horizontal-axis parameter and/or a corrected vertical-axis parameter based on a Finite Element Method. By numerically solving equations (3) and (5) of FIG. 7 using a numerical method such as but not limited to Finite Element Methods and the one or more pre-defined boundary conditions, advantageously, surface profiles of specimens with slopes up to 35 degrees can be reconstructed.

Referring to FIG. 5, according to some embodiments, capturing the plurality of interferograms of the surface profile may comprise synchronizing an actuation speed of a piezoelectric actuator modulating the modulated reference beam to an image-capturing speed of a camera. Capturing the plurality of interferograms may also comprise capturing the plurality of interferograms within a plurality of pre-determined phase locations of the piezoelectric actuator. The surface profile inspection method may further comprise operating the piezoelectric actuator within an operation range. The operation range may correspond to one wavelength of the specimen beam. Further, capturing the plurality of interferograms may comprise capturing the plurality of interferograms using a Fizeau-type interferometer.

Figure 8A:
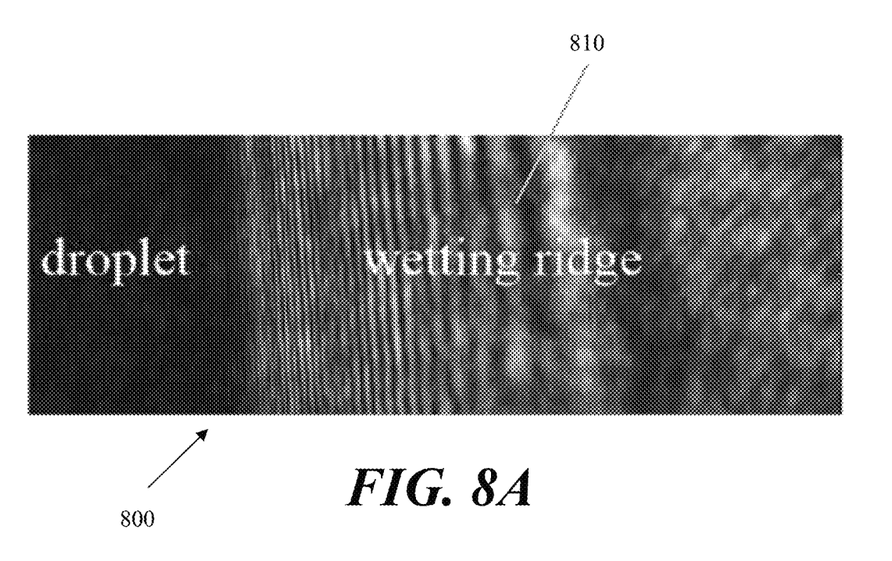
FIG. 8A depicts an interferogram of a wetting ridge and FIG. 8B depicts a reconstructed surface profile of the wetting ridge of FIG. 8A in accordance with the present embodiments.
Figure 8B:
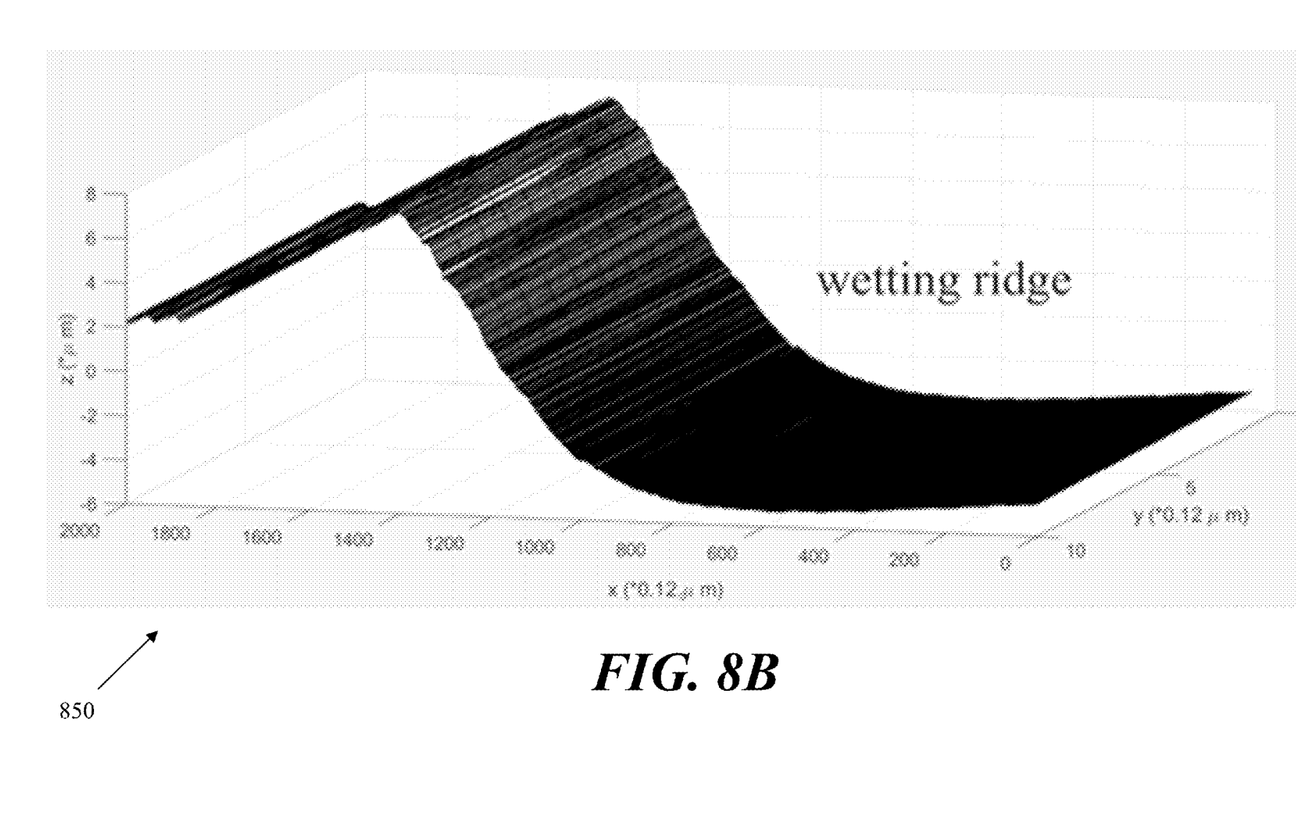
Figure 9:
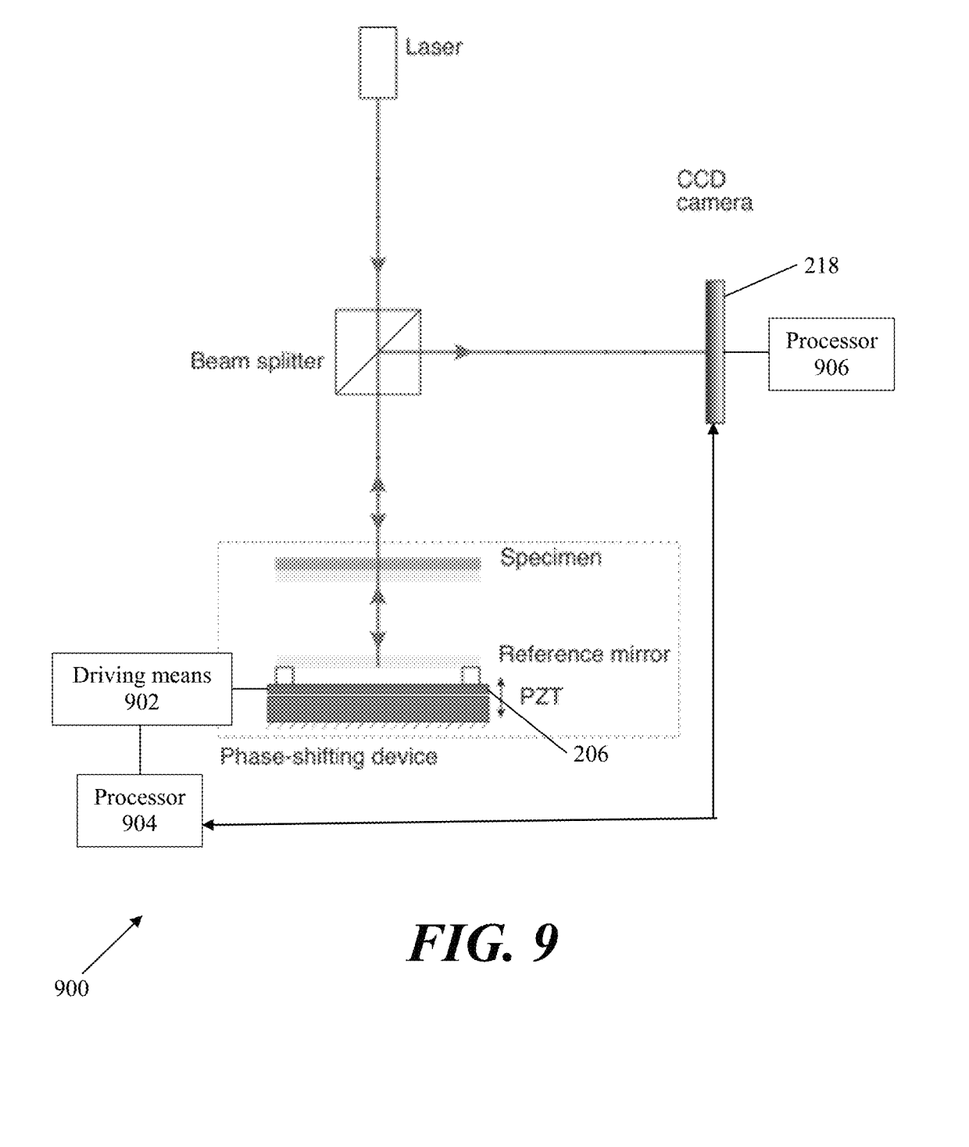
FIG. 9 depicts an illustration of a surface profile inspection system including processing means in accordance with present embodiments.

FIG. 8A depicts an interferogram 800 of a wetting ridge 810 and FIG. 8B depicts a reconstructed surface profile 850 of the wetting ridge 810 in accordance with present embodiments, FIG. 9 depicts an illustration 900 of a surface profile inspection system including processing means in accordance with present embodiments. As shown, the actuator 206 may be coupled to a driving means 902 configured to actuate the actuator 206. The driving means 902 may in turn be coupled to a processor 904, the processor configured to generate and provide signals to the driving means 902 to actuate the actuator 206 according to a desired actuation speed. For example, the desired actuation speed can correspond to the image-capturing speed of the camera 218 by coupling the processor 904 to the camera 218, a shown in FIG. 9, or by coupling the processor 904 to a processor 906 coupled to the camera 218. Further, the camera 218 may be coupled to the processor 906 for processing the captured interferograms. The processor 904 and the processor 906 can be a same processor or different processors.

The present embodiments also provide a computer readable medium comprising instructions for a processor to perform a surface profile inspection method. The instructions cause the processor to capture a plurality of interferograms of a surface profile depicting interference between a specimen beam reflected from a surface having the surface profile and a modulated reference beam, wherein each of the plurality of interferograms corresponds to a phase of modulation of the modulated reference beam. The instructions also cause the processor to extract pixel values of the plurality of interferograms. Further, the instructions cause the processor to calculate phase information of each of the plurality of interferograms based on the extracted pixel values, the phase information of each of the plurality of interferograms related to the phase of modulation of the modulated reference beam at a time the interferogram was captured. In addition, the instructions cause the processor to reconstruct the surface profile based on the calculated phase information.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A surface profile inspection method, comprising:
capturing a plurality of interferograms of a surface profile depicting interference between a specimen beam reflected from a surface having the surface profile and a modulated reference beam, wherein each of the plurality of interferograms corresponds to a phase of modulation of the modulated reference beam, and wherein capturing the plurality of interferograms comprises synchronizing an actuation speed of a piezoelectric actuator modulating the modulated reference beam to an image-capturing speed of an image-capturing means;
extracting pixel values of the plurality of interferograms;
calculating phase information of each of the plurality of interferograms based on the extracted pixel values, the phase information of each of the plurality of interferograms related to the phase of modulation of the modulated reference beam at a time the interferogram was captured; and
reconstructing the surface profile based on the calculated phase information.

2. The surface profile inspection method of claim 1, wherein reconstructing the surface profile comprises determining the surface profile based on the calculated phase information and one or more pre-defined boundary conditions.

3. The surface profile inspection method of claim 2, wherein the pre-defined boundary conditions comprise a horizontal-axis parameter, a vertical-axis parameter and/or an angle parameter.

4. The surface profile inspection method of claim 3, wherein reconstructing the surface profile comprises calculating a corrected horizontal-axis parameter and/or a corrected vertical-axis parameter in accordance with an auto-correcting algorithm using a full expression of an optical path difference between the reference beam and the specimen beam.

5. The surface profile inspection method of claim 1, wherein capturing the plurality of interferograms comprises capturing the plurality of interferograms within a plurality of pre-determined phase locations of the piezoelectric actuator.

6. The surface profile inspection method of claim 1, further comprising operating the piezoelectric actuator within an operation range, wherein the operation range corresponds to one wavelength of the specimen beam.

7. The surface profile inspection method of claim 1, wherein capturing the plurality of interferograms comprises capturing the plurality of interferograms using a Fizeau-type interferometer.

8. A surface profile inspection system, comprising:
an optical creating means configured to emit an incident beam;
a specimen supporting means configured to support a specimen having a surface having a surface profile and a reference mirror having a reference surface, wherein the reference mirror is supported on an actuator configured to modulate a reference beam;
an optical directing means configured to direct the emitted incident beam towards the surface having the surface profile and the reference surface;
an image-capturing means configured to capture a plurality of interferograms of the surface profile depicting interference between a specimen beam reflected from the surface having the surface profile and the modulated reference beam, wherein each of the plurality of interferograms corresponds to a phase of modulation of the modulated reference beam, and wherein the actuator configured to modulate the reference beam comprises a piezoelectric actuator having an actuation speed synchronized to an image-capturing speed of the image-capturing means; and
a processing means configured to:
extract pixel values of the plurality of interferograms;
calculate phase information of each of the plurality of interferograms based on the extracted pixel values, the phase information of each of the plurality of interferograms related to the phase of modulation of the modulated reference beam at a time the interferogram was captured; and
reconstruct the surface profile based on the calculated phase information.

9. The surface profile inspection system of claim 8, wherein the processing means is further configured to reconstruct the surface profile based on the calculated phase information and one or more pre-defined boundary conditions.

10. The surface profile inspection system of claim 9, wherein the pre-defined boundary conditions comprise a horizontal-axis parameter, a vertical-axis parameter and/or an angle parameter.

11. The surface profile inspection system of claim 10, wherein the processing means is further configured to calculate a corrected horizontal-axis parameter and/or a corrected vertical-axis parameter in accordance with an auto-correcting algorithm using a full expression of an optical path difference between the reference beam and the specimen beam to reconstruct the surface profile.

12. The surface profile inspection system of claim 8, wherein the image-capturing means is further configured to capture the plurality of interferograms within a plurality of pre-determined phase locations of the actuator.

13. The surface profile inspection system of claim 8, wherein the actuator is operated within an operation range, wherein the operation range corresponds to one wavelength of the incident beam.

14. The surface profile inspection system of claim 8, wherein the optical directing means comprises a Fizeau-type interferometer.

15. A non-transitory computer readable medium comprising instructions for a processor to perform a surface profile inspection method, the instructions causing the processor to:
- capture a plurality of interferograms of a surface profile depicting interference between a specimen beam reflected from a surface having the surface profile and a modulated reference beam, wherein each of the plurality of interferograms corresponds to a phase of modulation of the modulated reference beam, and wherein capturing the plurality of interferograms comprises synchronizing an actuation speed of a piezoelectric actuator modulating the modulated reference beam to an image-capturing speed of an image-capturing means;
- extract pixel values of the plurality of interferograms;
- calculate phase information of each of the plurality of interferograms based on the extracted pixel values, the phase information of each of the plurality of interferograms related to the phase of modulation of the modulated reference beam at a time the interferogram was captured; and
- reconstruct the surface profile based on the calculated phase information.

* * * * *

UNITED STATES PATENT AND TRADEMARK OFFICE
CERTIFICATE OF CORRECTION

| | | |
|---|---|---|
| PATENT NO. | : 12,018,931 B2 | Page 1 of 1 |
| APPLICATION NO. | : 17/749338 | |
| DATED | : June 25, 2024 | |
| INVENTOR(S) | : Xuan Quoc Vo and Anh Tuan Tran | |

It is certified that error appears in the above-identified patent and that said Letters Patent is hereby corrected as shown below:

On the Title Page

The Foreign Application Priority Data is missing.
Whereas it should read:
Foreign Application Priority Data
May 20, 2021 (SG) .................................10202105330W Signed and Sealed this
Third Day of September, 2024

Katherine Kelly Vidal
*Director of the United States Patent and Trademark Office*